United States Patent
Williams et al.

(10) Patent No.: US 7,236,544 B2
(45) Date of Patent: Jun. 26, 2007

(54) ENHANCED PREAMBLE TO ENABLE LOW POWER DETECTION

(75) Inventors: Richard G. C. Williams, Santa Rosa, CA (US); A. Joseph Mueller, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 742 days.

(21) Appl. No.: 10/670,140

(22) Filed: Sep. 24, 2003

(65) Prior Publication Data

US 2005/0063489 A1    Mar. 24, 2005

(51) Int. Cl.
*H03K 9/00*    (2006.01)
(52) U.S. Cl. ...................................... 375/316
(58) Field of Classification Search ................ 375/316, 375/259, 354, 355, 343
See application file for complete search history.

(56) References Cited

U.S. PATENT DOCUMENTS

| | | | | |
|---|---|---|---|---|
| 5,272,700 A * | 12/1993 | Hansen et al. | ............... | 370/480 |
| 5,555,305 A * | 9/1996 | Robinson et al. | ........... | 380/214 |
| 5,949,817 A * | 9/1999 | Marshall | ...................... | 375/142 |
| 6,021,391 A * | 2/2000 | Shyu | .............................. | 705/1 |
| 6,691,081 B1 * | 2/2004 | Huang et al. | ................ | 704/207 |
| 6,771,611 B1 * | 8/2004 | Garg | ........................... | 370/272 |
| 7,039,068 B1 * | 5/2006 | Halasz | ....................... | 370/473 |
| 7,106,749 B1 * | 9/2006 | Darshan et al. | ......... | 370/395.64 |
| 7,106,814 B2 * | 9/2006 | Carsello | ..................... | 375/343 |
| 2003/0161348 A1 * | 8/2003 | Mills et al. | ................. | 370/509 |
| 2003/0181211 A1 * | 9/2003 | Razavilar et al. | ........... | 455/450 |
| 2004/0101068 A1 * | 5/2004 | Wang et al. | ................. | 375/324 |
| 2005/0031308 A1 * | 2/2005 | Fu et al. | ....................... | 386/94 |
| 2006/0166619 A1 * | 7/2006 | Roberts | ....................... | 455/39 |

* cited by examiner

*Primary Examiner*—Emmanuel Bayard
(74) *Attorney, Agent, or Firm*—Steven A. Shaw; W. James Brady; Frederick J. Telecky, Jr.

(57) ABSTRACT

System and method for enabling the low power detection of a transmitted sequence. A preferred embodiment comprises the replacement of a portion of a preamble (after the application of any needed scrambling) with an expected sequence field (such as the expected sequence field 410). The expected sequence field may contain a sequence of values known at a receiver or a periodic sequence. The addition of the expected sequence field does not affect the length of the preamble and is compatible with existing receivers. The detection of the expected sequence field may be performed with analog circuitry, allowing receivers to place digital circuitry to sleep and reduce power

27 Claims, 2 Drawing Sheets

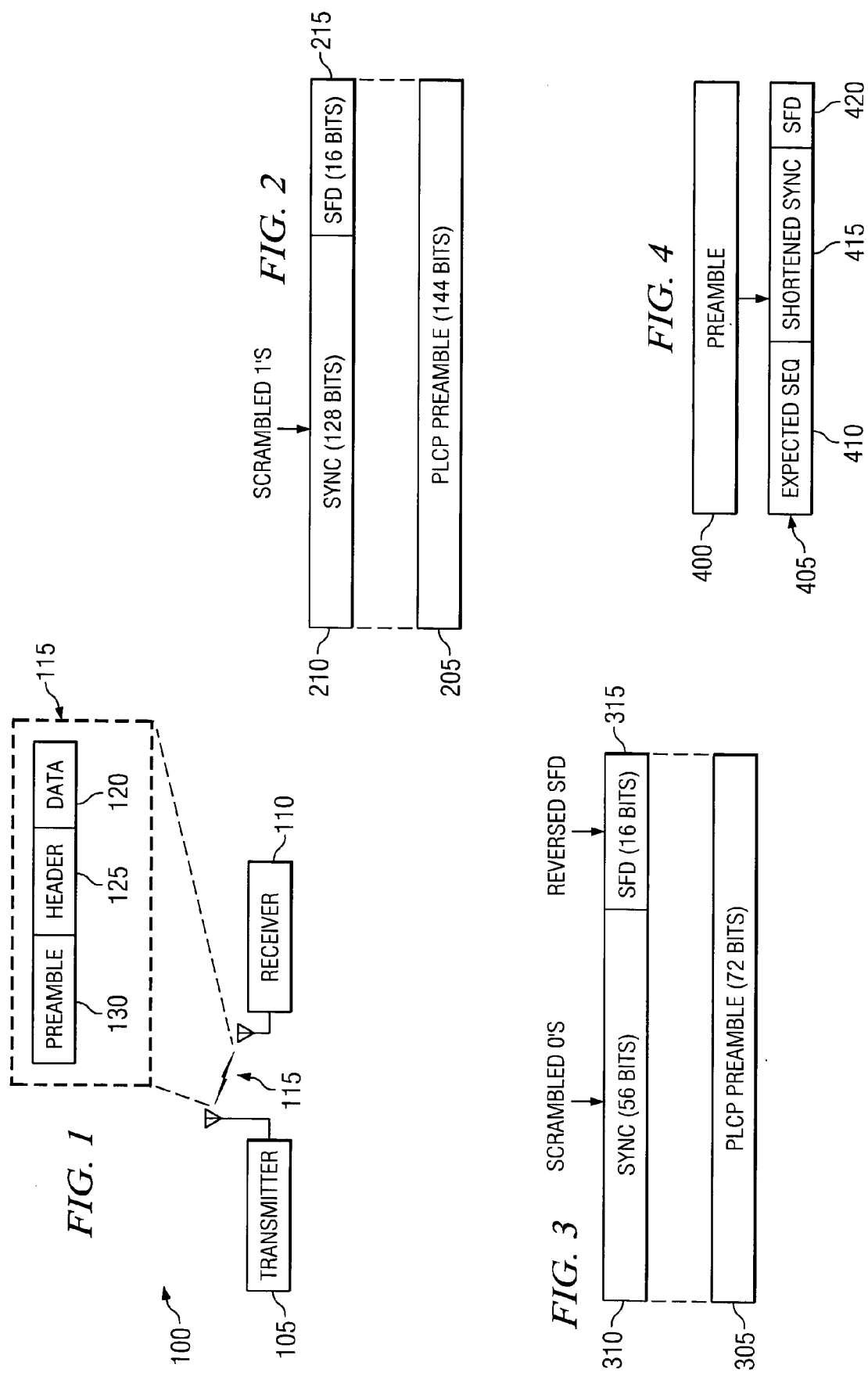

ENHANCED PREAMBLE TO ENABLE LOW POWER DETECTION

TECHNICAL FIELD

The present invention relates generally to a system and method for wireless digital communications, and more particularly to a system and method for enabling the detection of a transmitted sequence with minimized expenditure of power.

BACKGROUND

In an asynchronous wireless digital communications system, a preamble can be placed at the beginning of a transmission to help a receiver detect the presence of the transmission and to train receive circuitry to help optimize the reception of the transmission. The preamble may contain a specified sequence of information or values of certain length. The preamble may contain actual usable information that can provide information about the transmission. Alternatively, the preamble may contain no information regarding the transmission other than to inform the receiver of the presence of the transmission.

At a receiver, the receiver must be able to detect the presence of the preamble on the transmission medium (air for example) in order to train its receive circuitry and prepare to receive the remainder of the transmission. Since the communications system is asynchronous, the receiver does not know when the preamble will appear on the transmission medium. Therefore, the receiver may have to regularly check the transmission medium for the presence of the preamble. Once the receiver detects the presence of the preamble, the receiver can use the preamble to train its receive hardware and then prepare to receive the actual information carried in the transmission.

For example, in IEEE 802.11b compliant digital wireless communications systems, there can be two preambles differing from one another in length. A short preamble can start with a 56-bit sequence of values while a long preamble can start with a 128-bit sequence of values. Each bit can be scrambled by a scrambler which places a measure of randomness to the transmission. Note that for actual transmission purposes, these scrambled bits can be modulated (spread) with a spreading code. Therefore, when transmitted, each bit in the preamble can be represented by more than one value. According to the IEEE 802.11 technical standards, each bit in the preamble can be modulated by a pseudo-random number sequence commonly referred to as a Barker sequence. For example, an 11-value Barker sequence (B0=+1−1+1+1−1+1+1+1−1−1−1 or B1=−1+1−1−1+1−1−1−1+1+1+1) can be used to modulate the bits of the preamble, depending upon the value of the bit. In IEEE 802.11g compliant digital wireless communications systems there can be three preambles, one at each length as described above and a third for a different modulation type (orthogonal frequency division multiplexing (OFDM)).

However, detecting pseudo-random data sequences can be difficult, especially when the sequence being detected may be a random pattern of pseudo-random sequences (such as the Barker sequences) and may require the use of a significant amount of digital signal processing. For example, in an IEEE 802.11b compliant communications system, the scrambling effectively forces a receiver to detect an unknown pattern of Barker sequences (B0's and B1's). This signal processing can increase power consumption in the receiver, which can be a problem especially if the receiver is a battery powered device. A commonly used solution that has been used in the past to help in the detection of transmissions or to denote a special operating mode is the addition of a data field in the transmission. To assist in the detection of a transmission, the data field may contain an easy to detect sequence, while to denote a special operating mode, the data field may contain a specific value.

One disadvantage of the prior art is that the use of a pseudo-random initial state in a scrambler to scramble the bits in a preamble is that to a receiver, the transmitted preamble can appear to be noise on the transmission medium. Therefore, to be able to detect the preamble, the receiver may need to perform a significant amount of digital signal processing in order to differentiate between noise and a preamble. The need to perform digital signal processing in order to detect the preamble can imply that the receiver can not place its digital circuitry to sleep in order to reduce power consumption.

A second disadvantage of the prior art is that the use of an additional data field in a transmission can result in the inability of receivers which are adherent to a specific technical standard to understand the transmission. This may be a problem since it can be difficult to market a communications system that is incompatible (and hence, unusable) with a widely accepted technical standard.

A third disadvantage of the prior art is that the use of an additional data field may not be able to assist in simplifying the detection of the transmission if the additional data field is itself scrambled. If the additional data field is scrambled, then it could also appear as noise to a receiver.

SUMMARY OF THE INVENTION

These and other problems are generally solved or circumvented, and technical advantages are generally achieved, by preferred embodiments of the present invention which provides a system and method for enabling the detection of a sequence with minimized expenditure of power.

In accordance with a preferred embodiment of the present invention, a preamble to signify a transmission, the preamble comprising an expected sequence field, the expected sequence field to contain a first sequence of unscrambled values, wherein the first sequence of values is known by a receiver, and a synchronization field following the expected sequence field, the synchronization field to contain a second sequence of values scrambled by a scrambler.

In accordance with another preferred embodiment of the present invention, a method for low power preamble detection comprising detecting signals on a transmission medium, using analog circuits to match samples of the detected signals with a copy of an expected sequence, wherein the expected sequence is transmitted as part of the preamble, and enabling digital circuitry if the samples of the detected signal match the copy of the expected sequence In accordance with another preferred embodiment of the present invention, a method for preamble detection at a receiver comprising determining an operating mode of a transmitter, if the transmitter can transmit an expected sequence field in a preamble, detecting signals on a transmission medium, using analog circuits to match samples of the detected signals with a copy of an expected sequence, wherein the expected sequence is transmitted as part of the preamble, enabling digital circuitry if the samples of the detected signal match the copy of the expected sequence, the method further comprising if the transmitter does not transmit an expected sequence in a preamble, detecting signals on the transmission medium, and using digital circuits to process samples of the detected signals to search for a specific pattern.

An advantage of a preferred embodiment of the present invention is that the use of a specified sequence (or a periodic sequence) at the beginning of a preamble can allow a receiver to detect the presence of the preamble on a transmission medium with minimum (or no) use of digital signal processing. Therefore, the receiver can place a significant amount (or all) of its digital circuitry to sleep while it is attempting to detect the presence of a preamble. This can lead to a reduction in the receiver's power consumption.

A further advantage of a preferred embodiment of the present invention is that the use of the specified sequence at the beginning of a preamble can permit receivers enhanced to take advantage of the ability to detect the easier to detect preamble co-operate with receivers that are not enhanced. To unenhanced receivers, the preambles may simply appear to start at a later time and be preceded with an unrecognized sequence of values. This can permit the enhanced receivers to operate with unenhanced receivers and therefore will not require a large investment in replacing existing hardware.

The foregoing has rather broadly presented the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a diagram of a transmitter and a receiver of a communications system;

FIG. 2 is a diagram of the format of a long format preamble for an IEEE 802.11b compliant digital wireless communications system;

FIG. 3 is a diagram of the format of a short format preamble for an IEEE 802.11b compliant digital wireless communications system;

FIG. 4 is a diagram of an enhanced preamble, according to a preferred embodiment of the present invention;

DETAILED DESCRIPTION OF ILLUSTRATIVE EMBODIMENTS

Figure 5:
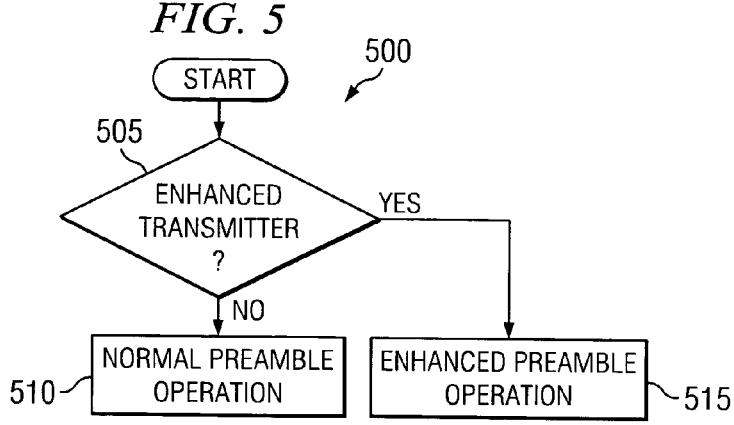
FIG. 5 is a flow diagram of possible modes of operation for a receiver, according to a preferred embodiment of the present invention.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a digital wireless communications system adherent to an IEEE 802.11 technical standard, such as IEEE 802.11b and IEEE 802.11g. The IEEE 802.11b technical standard is specified in a document entitled "Supplement to IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Higher-Speed Physical Layer Extension in the 2.4 GHz Band", published September 1999, while the IEEE 802.11g technical standard is specified in a document entitled "Supplement to IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Further Higher Data Rate Extension in the 2.4 GHz Band," published June 2003, both are herein incorporated by reference. The invention may also be applied, however, to other digital communications systems (both wired and wireless) that use a preamble with a pseudo-random data sequence to denote the beginning of a transmission.

With reference now to FIG. 1, there is shown a diagram illustrating a view of a transmitter 105 and a receiver 110 of a communications system 100 and a transmission 115 between the transmitter 105 and the receiver 110, wherein the communications take place asynchronously. Note that while FIG. 1 displays the transmitter 105 and the receiver 110 as being wirelessly connected, the present invention also has applicability in a wired environment and that the figure should not be construed as limiting the present invention to use in a wireless environment. Since the communications take place in an asynchronous manner, the transmission 115 may occur at any time (as long as a transmission medium is not already being used to carry some other transmission, i.e., the transmission medium is idle).

Examining the transmission 115 in greater detail, the transmission 115 can be broken up into three general parts: a data payload 120, a header unit 125, and a preamble 130. The data payload 120 can be used to carry the data being transmitted from the transmitter 105 to the receiver 110. The data payload 120 can be of fixed size or it may be of variable length, depending on the technical aspects of the communications system 100. The header unit 125 may contain information such as the intended recipient of the transmission 115, the originator of the transmission, the data rate of the payload 120, the length of the data payload 120 (if the communications system 100 supports variable length payload), and so forth. The preamble 130 can be used to notify receivers that a header and data payload will follow in short fashion. Additionally, the preamble 130 can be used to train receive circuits (such as equalizers and filters) in the receiver 110 to help optimize receive performance.

The communications system 100 is an asynchronous communications system, wherein there is no set time when a transmission may take place and that transmitters are free to transmit at anytime they are ready, typically as long as the transmission medium is idle. Note however, that there are communications systems that do not require that a transmitter check on the state of the transmission medium prior to transmission. Because there is no set time to begin a transmission, a marker may need to be transmitted prior to the transmission of the actual data to indicate to receivers that a transmission of data will follow. The preamble can be used as such a marker.

With reference now to FIG. 2, there is shown a diagram illustrating the format of a long format preamble 205 for an IEEE 802.11b compliant digital wireless communications system. According to the IEEE 802.11b technical standards, the long format preamble 205 can be broken up into two fields, a synchronization (SYNC) field 210 and a start frame delimiter (SFD) 215. The SYNC field 210 is 128 bits long and is made up of scrambled 1's while the SFD 215 is 16 bits long. Note that the description of the long format preamble 205 is prior to being scrambled and then modulated with a pseudo-random number sequence, specifically a Barker sequence. After modulation, each bit becomes a sequence of multiple values.

With reference now to FIG. 3, there is shown a diagram illustrating the format of a short format preamble 305 for an IEEE 802.11b compliant digital wireless communications system. According to the IEEE 802.11b technical standards, the short format preamble 305 can also be broken up into two fields, a synchronization (SYNC) field 310 and a start frame delimiter (SFD) 315. The SYNC field 310 is 56 bits long and is made up of scrambled 0's while the SFD 315 is 16 bits long. Note that the SFD 315 is reversed from the SFD 215 of the long format preamble 205. Again, the description of the short format preamble 305 is prior to it being scrambled and then modulated with a pseudo-random number sequence (a Barker sequence).

The use of the scrambler can make it difficult for a receiver to detect the presence of the preamble. This may be due to the fact that the scrambler may result in a preamble that is made up of a random pattern of pseudo-random number sequences. In fact, the use of the scrambler can prevent simple sequence detection techniques from detecting the preamble. Therefore, to detect the presence of the preamble, a receiver may need to use digital signal processing. The use of digital signal processing would require that the receiver maintain power to at least a portion of its digital circuitry at all times. This may increase power consumption and if the receiver is a battery operated device, then the amount of time that the receiver can operate on a single battery charge can be shortened.

With reference now to FIG. 4, there is shown a diagram illustrating an enhancement to a preamble 400 to permit low power detection, according to a preferred embodiment of the present invention. The preamble 400, as displayed in FIG. 4 can be a generic preamble that can be used in a variety of digital communications systems, such as those that are adherent to the IEEE 802.11 family of digital wireless communications systems. As discussed previously, a preamble that is used in an IEEE 802.11 digital wireless communications system is made up of two components: a synchronization (SYNC) field and a start frame delimiter (SFD) (neither shown). Note that FIG. 4 illustrates a preamble prior to transmission, i.e., a preamble that may have been modulated and/or scrambled as required by the digital communications system in which it is being used.

According to a preferred embodiment of the present invention, the preamble 400 can be modified to permit easier low power detection. Using a preamble usable in an IEEE 802.11 digital wireless communications system as an example, the SYNC field can be shortened and a specific sequence can be used in its place. A modified preamble 405 may appear as follows: an expected sequence field 410, followed by a shortened SYNC field 415, and finally an SFD 420. The expected sequence field 410 may contain a sequence of specified values that can enable easier detection at a receiver, perhaps without the need for the receiver to use any digital signal processing to determine its presence on the transmission medium. The shortened SYNC field 415 can be made out of the same sequence of values as a normal SYNC field, but only shorter. The SFD 420 may be identical to a normal SFD. Note that the shortened SYNC field 415 and the SFD 420 of the modified preamble 405 should be identical to corresponding entities in an unmodified preamble (with the exception of the duration) to help ensure compatibility with receivers which are not capable of taking advantage of the expected sequence field 410. Additionally, the combination of the expected sequence field 410 and the shortened SYNC field 415 and the SFD 420 (i.e., the modified preamble 405) should be of the same duration (length) as the preamble 400. This can also help ensure compatibility with receivers which are not capable of using the expected sequence field 410. Furthermore, the overall length of the modified preamble 405 should be the same length as an unmodified preamble to ensure compatibility with receivers that are not capable of using the expected sequence field 410.

Note that the use of an expected sequence prepended to a sequence to help in the detection of the sequence is a commonly used technique. However, these techniques are more concerned with assisting in making the detection of the sequence easier and not with ensuring the compatibility with existing hardware. By ensuring that the expected sequence and shortened SYNC field combined has the same structure, duration and overall length as an unmodified preamble, the modified preamble can be used in a network with both enhanced and unenhanced receivers.

Examples of the expected sequence field 410 may include, but are not limited to: a sequence of all 1's, a sequence of all 0's, a sequence of alternating 1's and 0's, a sequence of various combinations of equal length groups of alternating 1's and 0's wherein each group of 1's and 0's is longer than a single value, a periodic sequence, a sequence of several periodic sequences, and so forth. Note that the expected sequence field 410 should not undergo scrambling, since it is the effects of the scrambling that can result in detection difficulties. If the expected sequence field 410 should undergo scrambling, then the expected sequence could become as equally difficult to detect as an unmodified preamble. The modified preamble being made up of the shortened SYNC field, the expected field and SFD should then be modulated with the pseudo-random number spreading code as is done for the unmodified preamble.

According to a preferred embodiment of the present invention, the length of the expected sequence field 410 should be long enough to enable a receiver to detect its presence on the transmission medium, but short enough so that it would not shorten the SYNC field to such an extent that a receiver that is not enhanced to use the expected sequence field 410 can still detect the SYNC field in the transmission medium. With an IEEE 802.11 unmodified SYNC field being either 128 bits or 56 bits in length (prior to modulation with the spreading code) and 128 Barker sequences or 56 Barker sequences long after modulation, an acceptable length for an expected sequence field could be eight or nine Barker sequences in length. This would lead to a shortened SYNC field of length 120 and 48 Barker sequence (in the case of an eight Barker sequence length expected sequence field) or 119 and 47 Barker sequence (in the case of a nine Barker sequence length expected sequence field). Note that other lengths for the expected sequence field are possible and that the length of the expected sequence field is usually dependent upon the ability of the receivers in a digital communications system to detect the specific sequences and fields.

Unenhanced receivers, operating in an environment with transmitters and receivers that have been enhanced to take advantage of the expected sequence field in the preamble, should only suffer a small delay in acquiring the scrambler initial state and no other adverse effects. This may be due to the fact that the unenhanced receivers can make no presumption on what the preamble will look like, given that the unenhanced preamble uses scrambling. The delay in acquiring the scrambler initial state should be inconsequential provided that the scrambler initial state is obtained prior to receipt of the SFD portion of the preamble. This should be the case if the length of the expected sequence field is limited to a small to moderate percentage of that of the shortened SYNC field.

With reference now to FIG. 5, there is shown a flow diagram 500 illustrating possible modes of operation for a receiver with the ability to make use of an expected sequence field in preambles, according to a preferred embodiment of the present invention. According to a preferred embodiment of the present invention, a receiver with the ability to make use of an expected sequence field can switch between different modes of operation, depending upon transmissions. For example, if the receiver knows that the transmitter(s) are not capable of transmitting preambles with an expected sequence field, then the receiver can disable checking for an expected sequence field. Alternatively, if the receiver knows that the transmitter(s) are capable of transmitting preambles with an expected sequence field, then the receiver can enable checking for an expected sequence field.

According to a preferred embodiment of the present invention, a receiver may check to determine if the transmitter is capable of transmitting preambles with an expected sequence field (block 505). If the transmitter is not capable of transmitting preambles with an expected sequence field, then the receiver can operate in a normal mode where it searches for normal preambles (block 510). If the transmitter is capable of transmitting preambles with an expected sequence field, then the receiver can operate in an enhanced mode where it searches for the expected sequence field (block 515).

Figure 6:
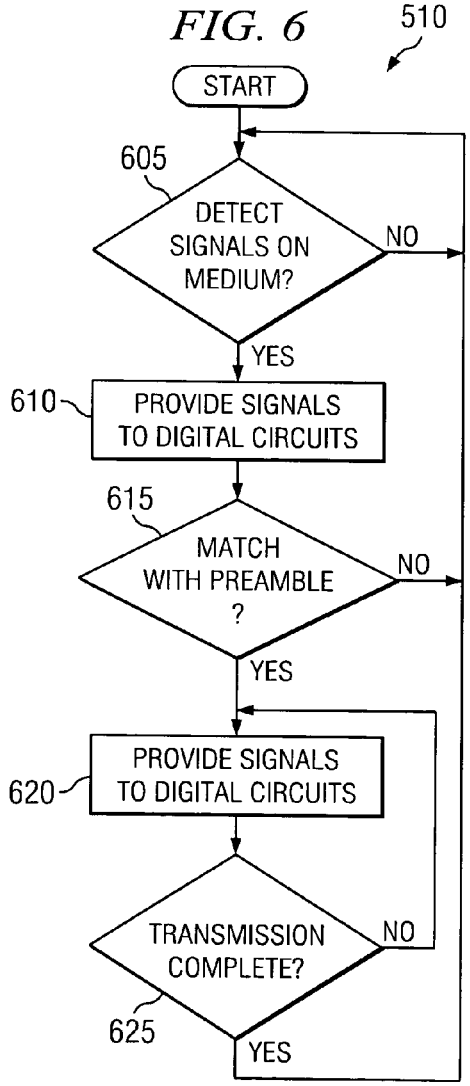
FIG. 6 is a flow diagram of a normal mode of operation for a receiver.

With reference now to FIG. 6, there is shown a flow diagram illustrating a normal mode 510 for a receiver receiving a transmission that is preceded with a normal preamble. As discussed previously, a normal preamble that has been scrambled may require digital signal processing by a receiver before the receiver can determine that it has received a preamble. Therefore, the receiver cannot place its digital circuitry to sleep, due to the fact that when the receiver detects a signal on a transmission medium, it may need to provide the signal to its digital signal processing circuits in order to determine the nature of the signals.

The normal operating mode 510 may begin with the receiver waiting for signals to be detected on the transmission medium (block 605). Once signals have been detected on the transmission medium, the receiver can sample the signals and provide them to its digital signal processing circuitry to determine if the signal is a part of a preamble (block 610). The receiver checks to see if the signals are part of a preamble (block 615). If the signals are not part of a preamble, then the receiver can return to block 605 to wait for the arrival of new signals.

If the signals are part of a preamble, then the receiver can use the signals to train its receive circuitry (not shown). The training of receive circuitry may depend upon the type of digital communications network, but may include adjusting equalizers and filters. Once the preamble completes and the receiver begins to actually receive a data portion of the transmission, the receiver can provide the signals to its digital circuitry for processing (block 620). When the transmission completes (block 625), the receiver can return to block 605 to wait for the arrival of new signals.

Figure 7:
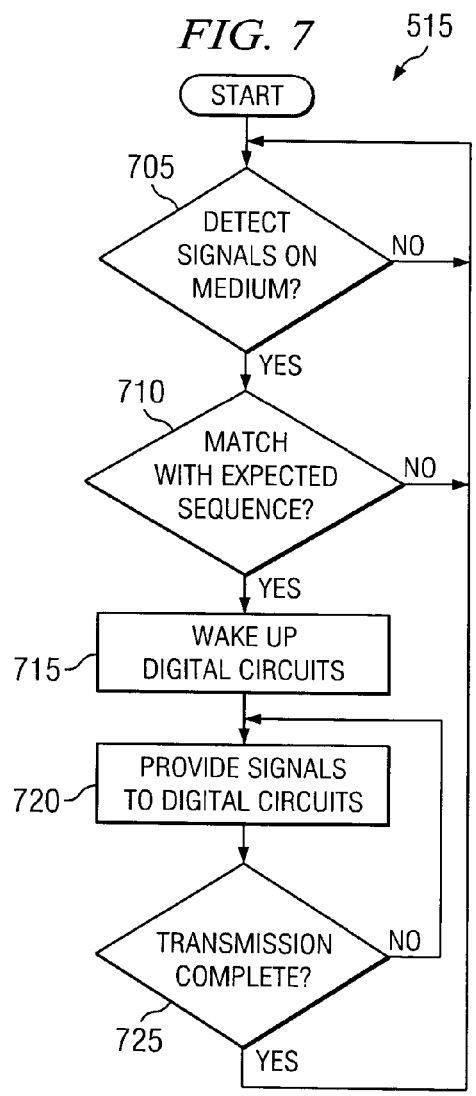
FIG. 7 is a flow diagram of an enhanced mode of operation for a receiver, according to a preferred embodiment of the present invention.

With reference now to FIG. 7, there is shown a flow diagram illustrating an enhanced mode 515 for a receiver receiving a transmission that is preceded with a preamble containing an expected sequence field, according to a preferred embodiment of the present invention. Since the use of an expected sequence field in a preamble may permit a receiver to use simple analog techniques to detect the presence of the preamble on a transmission medium, a receiver operating in the enhanced mode may be able to place its digital circuitry to sleep to reduce power consumption.

The enhanced operating mode 515 may begin with the receiver waiting for signals to be detected on the transmission medium (block 705). Once signals have been detected on the transmission medium, the receiver can sample the signals and provide them to its analog sequence detection circuitry to determine if the signal is a part of an expected sequence field (block 710). If the signals are not part of an expected sequence field, then the receiver can return to block 705 to wait for the arrival of new signals.

If the signals are part of an expected sequence field, then the receiver can wake up its digital circuitry (block 715) and then upon the completion of the reception of the expected sequence field and the initiation of the reception of the preamble, begin to train its receive circuitry (not shown). Once the preamble completes and the receiver begins to actually receive a data portion of the transmission, the receiver can provide the signals to its digital circuitry for processing (block 720). When the transmission completes (block 725), the receiver can return to block 705 to wait for the arrival of new signals.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A preamble to signify a transmission, the preamble comprising:
    an expected sequence field, the expected sequence field to contain a first sequence of unscrambled values, wherein the first sequence of values is known by a receiver; and
    a synchronization field following the expected sequence field, the synchronization field to contain a second sequence of values scrambled by a scrambler.

2. The preamble of claim 1, wherein the first sequence is inserted into the preamble before the remainder of the preamble has been modulated.

3. The preamble of claim 1, wherein the first sequence is inserted into the preamble after the remainder of the preamble has been scrambled.

4. The preamble of claim 1 further comprising a start frame delimiter following the synchronization field, the start frame delimiter to contain a third sequence of values scrambled by the scrambler.

5. The preamble of claim 1, wherein the preamble is an enhancement to an existing preamble, and wherein the expected sequence field and the synchronization field combined is equal in duration to a synchronization field in the existing preamble.

6. The preamble of claim 5, wherein the expected sequence field is transparent to a receiver expecting the existing preamble, and wherein the receiver may synchronize to the synchronization field.

7. The preamble of claim 1, wherein the first sequence of values is an arbitrary sequence of values, known to both a transmitter and the receiver.

8. The preamble of claim 1, wherein the first sequence of values is a sequence of 1's.

9. The preamble of claim 1, wherein the first sequence of values is a sequence of 0's.

10. The preamble of claim 1, wherein the first sequence of values is a sequence of alternating 1's and 0's.

11. The preamble of claim 10, wherein the first sequence of values is a combination of equal length groups of alternating 1's and 0's, wherein each group is of length greater than one value.

12. The preamble of claim 1, wherein the first sequence of values is periodic in nature.

13. The preamble of claim 1, wherein the expected sequence field and the synchronization field combined is equal to a multiple of the length of a pseudo-random number sequence, and wherein the expected sequence field is eight (8) times the length of the pseudo-random number sequence.

14. The preamble of claim 1, wherein the preamble can be used in a digital communications network.

15. The preamble of claim 14, wherein the digital communications network is wireless.

16. The preamble of claim 15, wherein the digital wireless communications network is adherent to an IEEE 802.11b technical standard.

17. The preamble of claim 15, wherein the digital wireless communications network is adherent to an IEEE 802.11g technical standard.

18. A method for low power preamble detection comprising:
    detecting signals on a transmission medium;
    using analog circuits to match samples of the detected signals with a copy of an expected sequence, wherein the expected sequence is transmitted as part of the preamble; and
    enabling digital circuitry if the samples of the detected signals match the copy of the expected sequence.

19. The method of claim 18 further comprising after the enabling:
    training receive circuitry with a remainder of the preamble; and
    providing data received after the preamble to the digital circuitry for processing.

20. The method of claim 19, wherein the method repeats after the providing.

21. The method of claim 19, wherein training comprises adjusting equalizers and filters based on the remainder of the preamble.

22. The method of claim 18 further comprising after the enabling:
    disabling the digital circuitry once processing related to the preamble is complete; and
    repeating the detecting, using, and enabling.

23. A method for preamble detection at a receiver comprising:
    determining an operating mode of a transmitter;
    if the transmitter can transmit an expected sequence field in a preamble,
        detecting signals on a transmission medium;
        using analog circuits to match samples of the detected signals with a copy of an expected sequence, wherein the expected sequence is transmitted as part of the preamble;
        enabling digital circuitry if the samples of the detected signal match the copy of the expected sequence;
    the method further comprising if the transmitter does not transmit an expected sequence in a preamble,
        detecting signals on the transmission medium; and
        using digital circuits to process samples of the detected signals to search for a specific pattern.

24. The method of claim 23 further comprising after the enabling:
    training receive circuitry with a remainder of the preamble; and
    providing data received after the preamble to the digital circuitry for processing.

25. The method of claim 23 further comprising after the second using:
    training receive circuitry with a remainder of the preamble; and
    providing data received after the preamble to the digital circuitry for processing.

26. The method of claim 23, wherein the receiver remains in an operating mode depending on the operating mode of the transmitter until the receiver is reset.

27. The method of claim 23, wherein the receiver remains in an operating mode depending on the operating mode of the transmitter until the receiver moves out of range of the transmitter and begins communicating with a different transmitter.

* * * * *